(12) United States Patent
Ghannam et al.

(10) Patent No.: US 8,824,151 B2
(45) Date of Patent: Sep. 2, 2014

(54) MOUNTING SYSTEM FOR AN ELECTRONIC CONTROL MODULE HOUSING IN A VEHICLE

(75) Inventors: Mahmoud Yousef Ghannam, Canton, MI (US); Todd N Clark, Dearborn, MI (US); Roy Joseph Scott, Saline, MI (US); Erich Kemnitz, Northville, MI (US); Bhimaraddi Venkaraddi Alavandi, Canton, MI (US); Se Kyoon Shin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 13/372,077

(22) Filed: Feb. 13, 2012

(65) Prior Publication Data

US 2013/0205560 A1    Aug. 15, 2013

(51) Int. Cl.
*H05K 5/00* (2006.01)
(52) U.S. Cl.
USPC .......................................... 361/752; 361/728
(58) Field of Classification Search
USPC ............................ 361/728–730, 752, 796, 800
See application file for complete search history.

(56) References Cited

U.S. PATENT DOCUMENTS

| | | | |
|---|---|---|---|
| 4,218,724 A | 8/1980 | Kaufman | |
| 4,409,641 A | 10/1983 | Jakob et al. | |
| 4,636,580 A * | 1/1987 | Neidig et al. | 174/548 |
| 5,756,934 A * | 5/1998 | Purdom | 174/544 |
| 6,302,706 B1 | 10/2001 | Aokie et al. | |
| 6,683,789 B1 | 1/2004 | Sheynis et al. | |
| 6,728,110 B2 | 4/2004 | Koyama | |
| 6,867,367 B2 * | 3/2005 | Zimmerman | 174/528 |
| 6,964,575 B1 | 11/2005 | Sailor | |
| 7,244,141 B2 | 7/2007 | Yamane et al. | |
| 7,291,023 B1 | 11/2007 | Still et al. | |
| 7,291,024 B2 | 11/2007 | Kiyota et al. | |
| 7,616,449 B2 * | 11/2009 | Batcheller et al. | 361/752 |
| 7,654,864 B2 | 2/2010 | Ishiguro et al. | |
| 8,144,476 B2 * | 3/2012 | Hirose | 361/752 |
| 8,269,103 B2 | 9/2012 | Kiyota | |
| 8,338,720 B2 * | 12/2012 | Burgi et al. | 174/541 |
| 2003/0178217 A1 | 9/2003 | Wang et al. | |
| 2006/0046535 A1 | 3/2006 | Iida | |
| 2009/0017648 A1 | 1/2009 | Sano et al. | |

FOREIGN PATENT DOCUMENTS

JP    2000/350331    12/2000
JP    2011/234494    11/2011

* cited by examiner

*Primary Examiner* — Hung S Bui
(74) *Attorney, Agent, or Firm* — Diederiks & Whitelaw, PLC

(57) ABSTRACT

A mounting system for a control module in a vehicle comprises a housing with a flange formed with an opening adapted to receive a fastener for securing the housing to the vehicle. A crack initiator causes a crack to occur in the flange or the housing and thus reduces bending of the housing during a side impact collision causing lateral forces. Preferably, an attachment bolt extends through the opening into the vehicle and the flange forms a C-shape around the opening to allow lateral forces during the side impact collision to force the attachment bolt to slide out of the opening. Preferably, electronic components in the module include an event data recorder for recording data about the vehicle collision and relaying the data after the collision, a communications system for calling for assistance and a controller for cutting off the vehicle fuel supply.

19 Claims, 3 Drawing Sheets

MOUNTING SYSTEM FOR AN ELECTRONIC CONTROL MODULE HOUSING IN A VEHICLE

BACKGROUND OF THE INVENTION

1. Field of Invention

The present invention pertains to the field of electronic control module mounting systems designed to protect electronic controls mounted within a control module of a vehicle when the vehicle is in a collision, particularly when the vehicle is subjected to a side impact.

2. Background of the Invention

Various electronic control systems are used in automotive vehicles. The control systems may relate to all aspects of vehicle control. Transmission control systems, for example, have numerous sensors that are connected by wires to one or more control modules. The transmission control modules are also connected to actuators within the transmission so that the control modules are able to control the transmission based on various sensed parameters obtained from the sensors. The sensed parameters relevant to transmission control typically include driver demand from a throttle sensor, engine speed through an engine speed sensor, etc. The transmission control modules then cause the transmission to shift between various speed ratios as the vehicle is driven. Other control modules include a fuel control module and an engine control module for regulating a fuel pump and an engine respectively. Typically, the different types of control modules will communicate with each other. For example, the transmission control module preferably signals the engine control module to reduce power during certain speed ratio shifts and the engine control module signals the fuel control module to provide more or less fuel based on the needs of the engine.

Yet another type of control module is a restraint crash control module, which is involved with controlling activation of seat belts and airbags during a crash. The restrain crash module receives information from sensors and determined if the vehicle is in a collision. An event data recorder, often referred to as a "black box", is another type of control module. This module records data during a collision and preserves the data for later retrieval. The functions of the event data recorder may be performed by a stand-alone control module or incorporated into another control module, such as the restrain crash module.

While the different types of control modules serve different and sometimes overlapping functions, each module is usually provided with a housing that is mounted to a structural member of the motor vehicle. Within the housing each module preferably has one or more printed circuit boards supporting electronic components that preform the tasks required of the control module. Additionally, control module housings are provided with connectors for wiring that provide communication to sensors, actuators and other control modules. In the past, control modules did not have to function after a collision. Throughout a collision event, control of restraint systems, such as airbag deployment or seatbelt control, is important for the safety of passengers. However, the systems did not need to function after the collision.

Government regulations now require vehicle crash data to be recorded during the collision and retrievable at a later time after the collision. Additional regulatory requirements specify that the control system for the vehicle call emergency responders by, for example, calling 911, both to request assistance and transmit data to emergency responders regarding details of the collision until the control system receives confirmation that the request has been received. Also, the control system must cut the fuel supply when a collision is sensed. Furthermore, the control module performing these functions must still be able to function after severe side impacts. A standard test for such side impacts is described in Federal Motor Vehicle Safety Standard 214, "Side Impact Protection" (promulgated by the United States Department of Transportation, National Highway Traffic Safety Administration and hereinafter referred to as FMVSS 214). FMVSS 214 describes the details of severe side impacts used to test vehicles including details of a 20 mile per hour side impact into a pole.

Such severe side impacts will usually destroy the functionality of existing control modules. Even when modules are mounted in relatively protected areas of the vehicle, the modules are often destroyed. A conventionally mounted control module placed on the center tunnel of a vehicle between the front seats will survive long enough to control deployment of restraint devices but still will not meet the new government regulatory requirements. As the tunnel or other mounting surface deforms, the housing of the control module also deforms, thus damaging the circuit boards and other electronic components of the module and rendering the module inoperable, thereby being incapable of meeting the new government requirements.

As can be seen by the above discussion, there exists a need for a mounting system allowing for an electronic control module to survive a severe vehicle side impact collision and still be able to record data that can be retrieved later, send a distress signal until the control module receives confirmation that the signal has been received, and send a signal to the fuel control module to cut off the fuel supply.

SUMMARY OF THE INVENTION

A mounting system for a control module in a vehicle comprises a housing with a central cavity. Electrical components are located in the cavity. A flange extends from the housing and is formed with an opening adapted to receive a fastener, such as an attachment bolt for securing the housing to the vehicle. The flange forms a C-shape around the opening to allow lateral forces during the side impact collision to force the attachment bolt to slide out of the opening. In order to further protect the electrical components, a crack initiator can be provided which causes a crack to occur in the flange or the housing and thus reduces bending of the housing due to lateral forces developed during a side impact collision. The crack initiator is preferably established by a V-shaped slot oriented relative to the vehicle to produce a crack when subject to the lateral forces, with the crack causing the flange to break away from the housing during the collision of the vehicle. The crack initiator extends generally parallel to the longitudinal axis of the vehicle.

The housing includes a front wall, a back wall and side walls extending between the front wall and back wall. An electrical connector is mounted on the back wall. The flange is attached to one sidewall with a reinforcing fin or gusset. The crack initiator is positioned to propagate a crack through the reinforcing fin. Optionally, there are two additional flanges extending from the other side wall with two crack initiators per flange, specifically with a crack initiator located on each side of a respective bolt opening. Preferably, the electronic components include an event data recorder for recording data about the vehicle collision and relaying the data after the collision, a communications system for calling 911 for assistance and a module for cutting off the vehicle fuel supply.

Additional objects, features and advantages of the invention will become more readily apparent from the following detailed discussion of preferred embodiments wherein like reference numerals refer to corresponding parts in the several views.

DETAILED DESCRIPTION OF PREFERRED EMBODIMENTS

Figure 1:
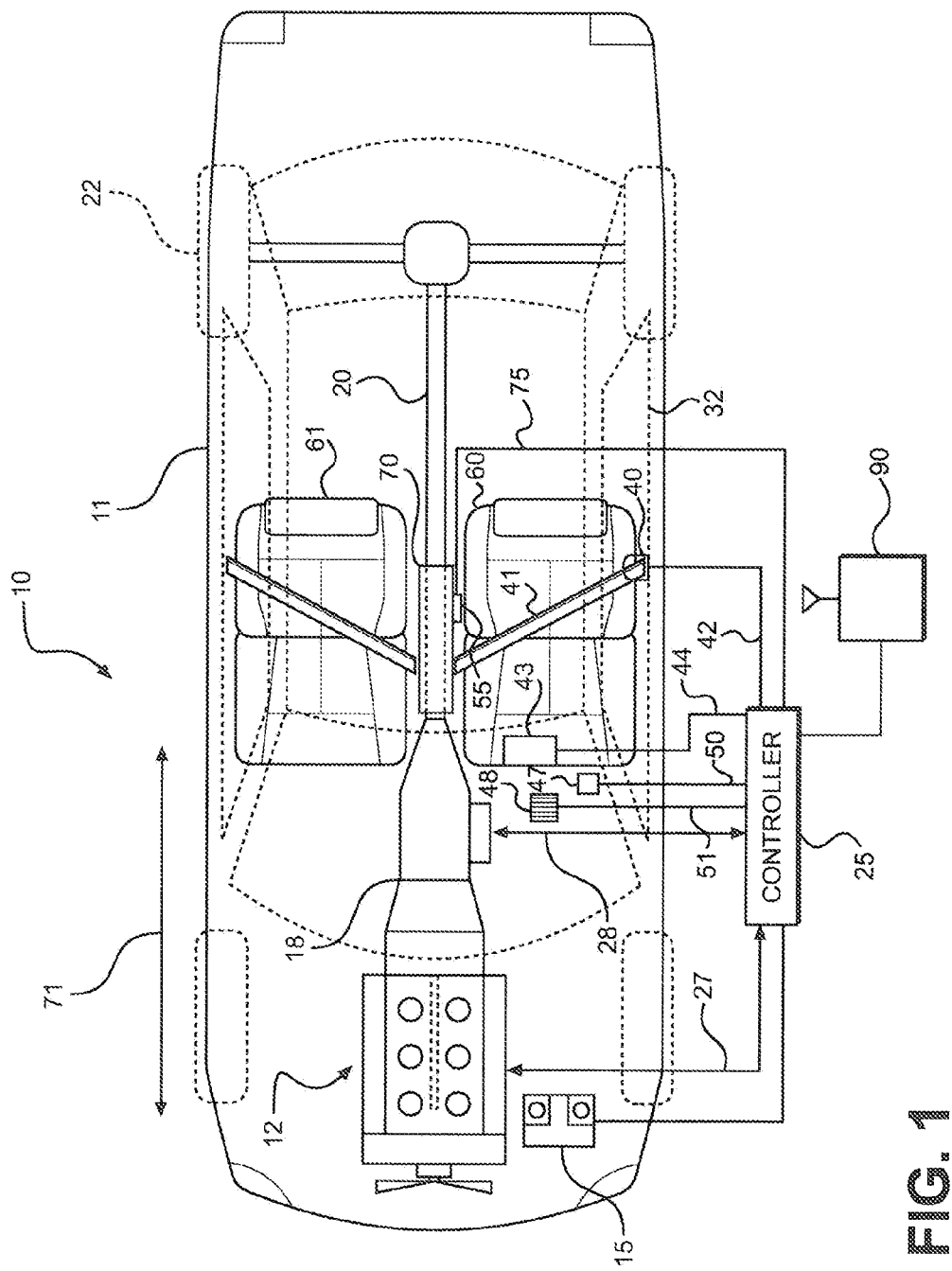
FIG. 1 is a diagram showing a vehicle incorporating a control module mounted in accordance with the invention.

With initial reference to FIG. 1, there is shown an automotive vehicle 10 having a body 11 and an engine 12 with a battery 15. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed. In addition, although engine 12 is shown as an internal combustion engine, other types of drive arrangements, including hybrid drive systems, could be utilized. A controller 25 is connected to engine 12 and transmission 18 by communication lines 27 and 28 respectively. Controller 25 uses inputs from several sources to obtain information used to control engine 12 and transmission 18. A seat belt sensor 40 determines if a seat belt 41 is buckled or unbuckled and is also connected to controller 25 through a communication line 42. An airbag 43 is connected to controller 25 through communication line 44. An ignition switch 47 and a brake sensor 48 are connected to controller 25 through lines 50 and 51 respectively. Controller 25 is able to control engine 25 in response to different events that occur when automotive vehicle 10 is operating. For example, controller 25 is able to control fuel being supplied to engine 12.

Controller 25 is shown schematically as a box. However, controller 25 is preferably formed from different modules. One such module is a crash restraint module 55 designed to control the deployment of airbag 43 and operation of seat belt 41 during a collision. Crash restraint module 55 preferably is mounted in a relatively secure area of vehicle 10, such as between a driver's seat 60 and a passenger's seat 61 on what is commonly referred to as a tunnel 70. Tunnel 70 is preferably formed of sheet metal and extends in a longitudinal direction 71 along vehicle 10 above powertrain 20. Since crash restraint module 55 is designed to perform various tasks when vehicle 10 is in a collision, crash restraint module 55 is placed in a secure area and designed to survive the forces developed due to the collision. A communication line 75 in vehicle 10 enables crash restraint module 55 to communication with other systems in vehicle 10 such as the airbag 43, seat belt 41 and the fuel supply to engine 12. Preferably, crash restraint module 55 is also connected to a communication device 90 such as a radio or telephone so that crash restraint module 55 can broadcast an emergency signal during a collision.

Figure 2:
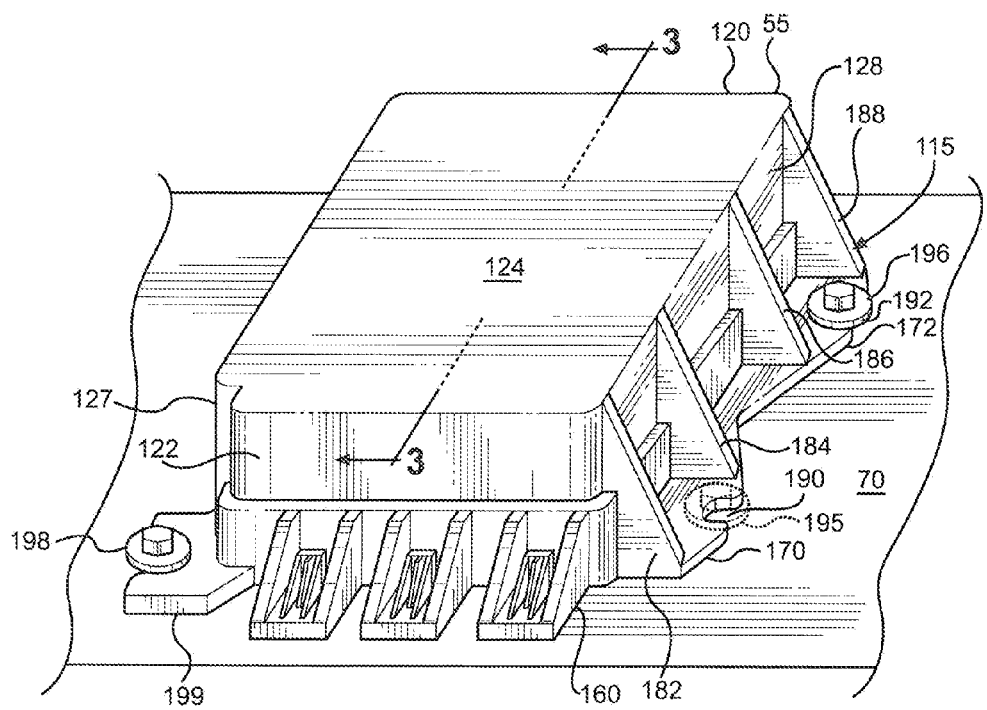
FIG. 2 is a top isometric view of a control module incorporating a mounting system with C-shaped mounting flanges in accordance with a first preferred embodiment of the invention.
Figure 3:
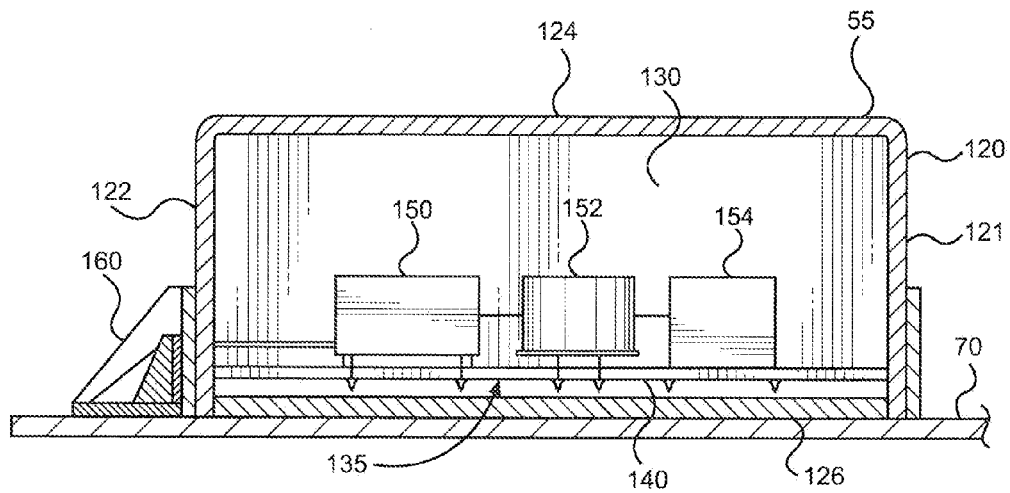
FIG. 3 is cross-sectional view of the control module shown in FIG. 2 taken along the line 3-3.

With reference to FIGS. 2 and 3, depicted are enlarged views of crash restraint control module 55 incorporating a mounting system 115 that allows module 55 to be protectably attached to vehicle 10. Module 110 has an outer housing 120 preferably made from a relatively strong material such as aluminum or steel. Outer housing 120 is generally box-shaped and provided with front 121, back 122, top 124, bottom 126, and both left and right side walls 127 and 128 surrounding an inner cavity 130 for containing various electronic components 135. More specifically, crash restraint module 55 is provided with a printed circuit board 140 supporting electronic components 135. Electronic components 135 include a central processing unit 150 connected to a memory unit 152 and an other electronic unit 154. Central processing unit 150 is also connected to a set of externally spaced electrical connectors 160. Connectors 160 are attached to communication line 75 as described above and provided along back wall 122 where connectors 160 are well protected from lateral forces and do not interfere with mounting system 115. Right side wall 128 is provided with longitudinally spaced mounting flanges 170, 172 which extend flush with bottom wall 126. Mounting flanges 170, 172 are reinforced with gussets 182, 184, 186 and 188 that extend upward along right side wall 128. Two gussets 182, 184, 186 and 188 are provided for each mounting flange 170, 172. Each flange 170, 172 is provided with a central opening 190, 192 adapted to receive a fastener, such as an attachment bolt 195, 196. Preferably, left side wall 127 also includes an attachment bolt 198 and an associated flange 199. Bolts 195, 196, 198 are not only utilized to mount housing 120, but can also function to ground electronic components 150, 152, 154.

One of the main causes of damage to circuit board 140 and electronic components 150, 152 and 154 is deformation of housing 120. During a collision, the sheet metal of tunnel 70 can be bent and crushed. If housing 120 is securely attached to the sheet metal of tunnel 70 in a conventional manner then housing 120 would deform along with the sheet metal of tunnel 70 which, in turn, would cause damage to the electronic components. To counter this problem, each flange 170, 172, 199 is specifically configured to be C-shaped, thereby allowing each flange 170, 172, 199 and its respective bolt 195, 196, 198 to separate when vehicle 10 is subject to large lateral forces that deform tunnel 70.

More specifically with particular reference to FIG. 2, module 55 has three flanges, with two flanges 170, 172 along right side wall 128 and one flange 199 on a corner portion of left side wall 127. The forces present in a side impact crash will tend to force the bolts 195, 196, 198 laterally toward or away from the side walls 127, 128. Since each opening 190, 192 in a respective C-shaped flange 170, 172 is aligned with the relative motion of the bolts 195, 196, 198, the bolts 195, 196 or 198 on one side of module 55 will be able to readily separate from the flanges 170, 172 or 199 during a side impact. For example, bolts 195, 196 can readily separate from flanges 170, 172 while bolt 198 will continue to be retained in flange 199 to retain housing 55 on tunnel 70 without damaging housing 55 or electronic components 150, 152, 154 found therein. In order to enable this bolt release function to occur, the bolts 195, 196, 198 can be tightened to a predetermined torque or upon respective sleeves (not shown) arranged in the openings 190, 192 to control the force applied by the bolts 195, 196, 198 to the flanges 170, 172, 199.

Figure 4:
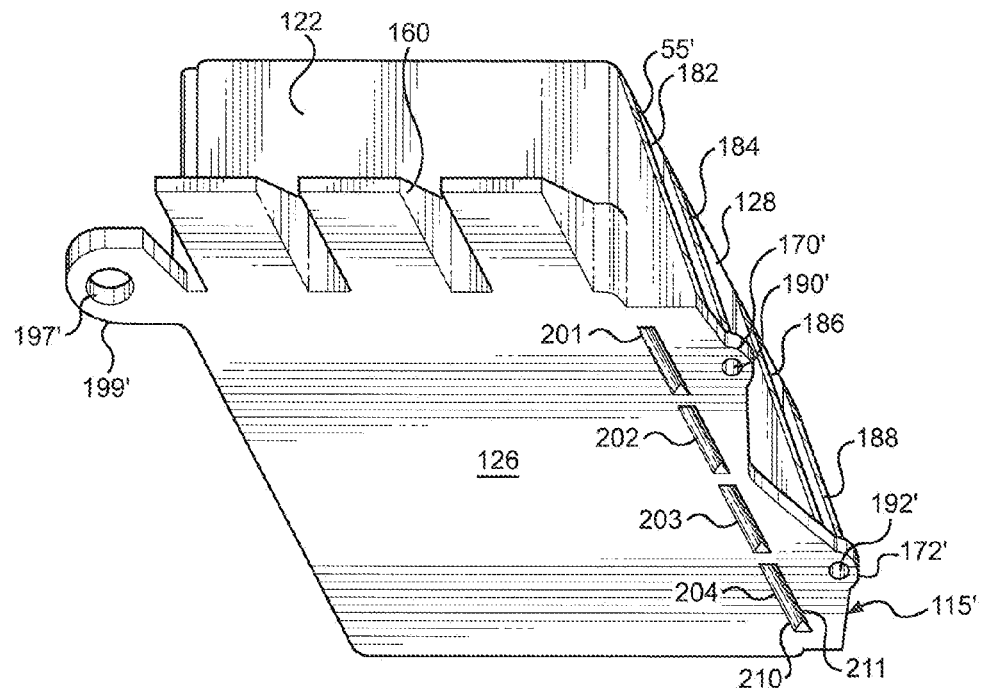
FIG. 4 is a bottom isometric view of a control module incorporating a mounting system in accordance with mounting flanges having crack initiators in accordance with a second preferred embodiment of the invention.
Figure 5:
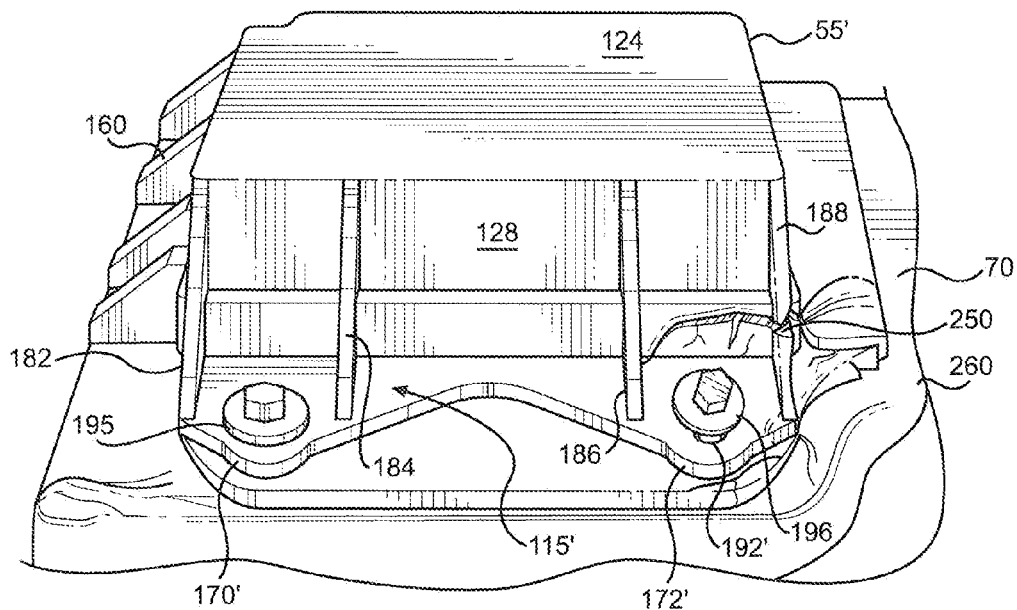
FIG. 5 is an isometric view of the control module of FIG. 4 mounted to a vehicle showing damage caused by a side impact collision.

Turning now to FIGS. 4 and 5 there is shown a module 55' incorporating a mounting system 115' in accordance with a second preferred embodiment of the invention wherein like reference numerals refer to corresponding parts when compared to the embodiment of FIGS. 1-3. The overall structure of module 55' is the same as that shown the first preferred embodiment but with some distinct differences in the mounting system. Therefore, a discussion of the overall structure of module 55' and mounting system 115' will not be provided. Instead, the differences between modules 55, 55' will be discussed below. In accordance with this embodiment, module 55' is provided with flanges 170', 172', 199' which not C-shaped but rather have central holes 190' 192', 197' to receive a respective attachment bolt 195, 196 (only two bolts being shown). With this arrangement, the attachment bolts 190', 192' will not detach from flanges 170', 172' during a collision. Instead, crack initiators 201, 202, 203, 204 are provided near holes 190', 192', 197' on bottom wall 126 of module 55'. Crack initiators 201, 202, 203, 204 are placed at a base of each flange 170', 172' at positions laterally spaced from side wall 128 and under a respective gusset 182, 184, 186, 188. Preferably, each crack initiator 201/204 takes the form of a longitudinal slot having a V-shape, as exemplified by the V-shape of initiator 204 having side walls 210, 211. With this construction, crack initiators 201-204 are strategically positioned and shaped to initiate a crack 250 along a respective gusset 182, 184, 186, 188.

More specifically, with particular reference to FIG. 5, a significant side impact to body 11 of vehicle 10 will cause tunnel 70 to deform, such as shown at 260. Based on this exemplary side impact, flange 172' will be subject to lateral forces from attachment bolt 196. As a weakened portion is established through the provisions of crack initiator 204, flange 172' will be caused to strategically crack from bottom wall 126 through gusset 188 in order to partially or completely separate flange 172' from housing 55'. Therefore, based on this side impact, housing 55' will only be held in place by remaining bolts 196, 198. Most importantly, housing 55' is isolated from the deformation of the sheet metal 260 on tunnel 70 and thus electronic components 150, 152, 154 are protected so as to remain grounded and connected to communication device 90. In particular, it has been found that electronic components 150, 152, 154 will remain functional at least through a 20 mph side impact crash into a pole or other side impacting object, including another vehicle. In addition, as wiring connection 160 is attached to back wall 122, this arrangement to minimizes possible damage and twisting loads involved with communication line 75 from a collision.

Based on the above, it should be readily apparent that the mounting systems of the invention control the dynamic interaction between the restraint control module housing and the tunnel. In each embodiment disclosed, at least one bolt will remain attached to restrain the crash module after a collision and the electronic components will remain grounded and connected to the communication device. As the crash module retains information and functions as an event data recorder, it is important that the module not only survive the collision, but at least portions of the module stay in contact as long as possible with the tunnel during side impact, as well as frontal, rear and rollover accidents. However, in connection with the side impacts wherein the module is not as well protected from other energy absorption structure of the vehicle, a controlled lateral breakaway of at least one of the attachment flanges is assured, thereby removing undesired loading stresses from the remaining attachment flange(s) and protecting restrain control module from being pulled with tunnel deformation. In this manner, the information will be retrievable after the collision. Also, the module will still operate to call for assistance after a collision and preferably continues to call until confirmation that a distress call has been received. Furthermore, since the control module is connected to the engine, the fuel supply can be advantageously cut off when a collision has been detected.

Although described with reference to preferred embodiments of the invention, it should be readily understood that various changes and/or modifications could be made to the invention without departing from the spirit thereof In particular, although the C-shaped flange and the crack initiator arrangements have been separately described in detail, it should be recognized that these two aspects of the invention can be used in combination such that direct lateral forces will cause the mounting bolts to shift relative to the flanges, but any significant twisting forces will cause the respective flange to crack. In general, the invention is only intended to be limited by the scope of the following claims.

The invention claimed is:

1. In a vehicle extending in a longitudinal direction and including a driver's seat, a passenger's seat, and a control module having a housing with an internal cavity and an electrical component located in the internal cavity, a mounting system for the control module comprising:
   a flange extending from the housing and being formed with an opening;
   a fastener passing through the opening and securing the housing to a body portion of the vehicle; and
   a crack initiator oriented relative to the vehicle to cause a crack to enable relative movement between the flange and the housing in response to lateral forces imparted on the housing by a side impact collision of the vehicle, whereby lateral forces on the housing are reduced and the electrical component is protected;
   wherein the housing includes a front wall and a back wall aligned in the longitudinal direction and the housing includes at least one electrical connector linked to the electrical component and exposed at the back wall.

2. The mounting system of claim 1, wherein the fastener is an attachment bolt extending through the opening and into a body portion of the vehicle.

3. The mounting system of claim 2, wherein the opening is C-shape, allowing the attachment bolt to slide out of the opening during the side impact collision of the vehicle.

4. The mounting system of claim 1, wherein the crack initiator is adapted to cause the flange to break away from the housing during the side impact collision.

5. The mounting system of claim 1, wherein the crack initiator constitutes a slot.

6. The mounting system of claim 5, wherein the slot is V-shaped.

7. The mounting system of claim 5, wherein the housing includes a front wall, a back wall, side walls and a bottom wall, said slot being formed in the bottom wall.

8. The mounting system of claim 7, further comprising: a plurality of additional, longitudinally spaced slots formed in the bottom wall establishing a plurality of crack initiators.

9. The mounting system of claim 1, wherein the housing includes a side wall between the front wall and back wall and the flange extends from the side wall of the housing.

10. The mounting system of claim 1, wherein the housing is mounted between the driver's seat and the passenger's seat and the electrical component is an event data recorder for recording data about the vehicle collision or a communications system for broadcasting an emergency request.

11. In a vehicle extending in a longitudinal direction and including a driver's seat, a passenger's seat, and a control module having a housing with an internal cavity and an electrical component located in the internal cavity, a mounting system for the control module comprising:
- a flange extending from the housing and being formed with an opening;
- a fastener passing through the opening the housing to a body portion of the vehicle; and
- a crack initiator oriented relative to the vehicle to cause a crack to enable relative movement between the flange and the housing in response to lateral forces imparted on the housing by a side impact collision of the vehicle, whereby lateral forces on the housing are reduced and the electrical component is protected, wherein the flange is attached to the side wall through a reinforcing fin and the crack initiator is positioned to propagate the crack through the reinforcing fin.

12. The mounting system of claim 11, wherein the crack initiator is adapted to cause the flange to break away from the housing during the side impact collision.

13. In a vehicle extending in a longitudinal direction and including a driver's seat, a passenger's seat, and a control module having a housing including a front wall, a back wall, opposing side walls forming an internal cavity and an electrical component located in the internal cavity, a mounting system for the control module comprising:
- a flange extending from one sidewall of the housing and being formed with a C-shaped opening;
- at least one additional flange including a respective C-shaped opening extending from another one of the opposing side walls; and
- an attachment member extending through each C-shaped opening into a body portion of the vehicle to secure the housing within the vehicle between the driver's seat and the passenger's seat while allowing at least one attachment member to slide out of a respective said opening during a side impact collision of the vehicle, whereby lateral forces on the housing are reduced and the electrical component is protected.

14. The mounting system of claim 13, wherein each C-shaped opening opens laterally with respect to the longitudinal direction.

15. The mounting system of claim 13, further comprising: a third flange including a respective C-shaped opening extending from one of the opposing side walls.

16. The mounting system of claim 15, wherein the component is an event data recorder for recording data about the vehicle collision or a communications system for broadcasting an emergency request.

17. The mounting system of claim 13, wherein the flange is attached to a side wall through a reinforcing fin and a crack initiator is oriented relative to the vehicle to cause a crack to enable relative movement between the flange and the housing in response to lateral forces imparted on the housing by a side impact collision of the vehicle and is positioned to propagate a crack through the reinforcing fin.

18. The mounting system of claim 17, wherein the crack initiator is adapted to cause the flange to break away from the housing during the side impact collision.

19. In a vehicle extending in a longitudinal direction and including a driver's seat, a passenger's seat, and a control module having a housing with a bottom wall, an internal cavity and an electrical component located in the internal cavity, a mounting system for the control module comprising:
- a first flange extending from the housing and being formed with a first opening;
- a second flange extending from the housing and being formed with a second opening;
- a fastener passing through each of the first and second openings and securing the housing to a body portion of the vehicle; and
- a plurality of crack initiators formed in the bottom wall and extending from the first flange to the second flange, wherein the plurality of crack initiators is oriented relative to the vehicle to cause a crack to enable relative movement between the first or second flange and the housing in response to lateral forces imparted on the housing by a side impact collision of the vehicle, whereby lateral forces on the housing are reduced and the electrical component is protected.

* * * * *